Dec. 24, 1957 W. S. LEE 2,817,772
PULSE SWITCHING APPARATUS
Filed Sept. 29, 1955
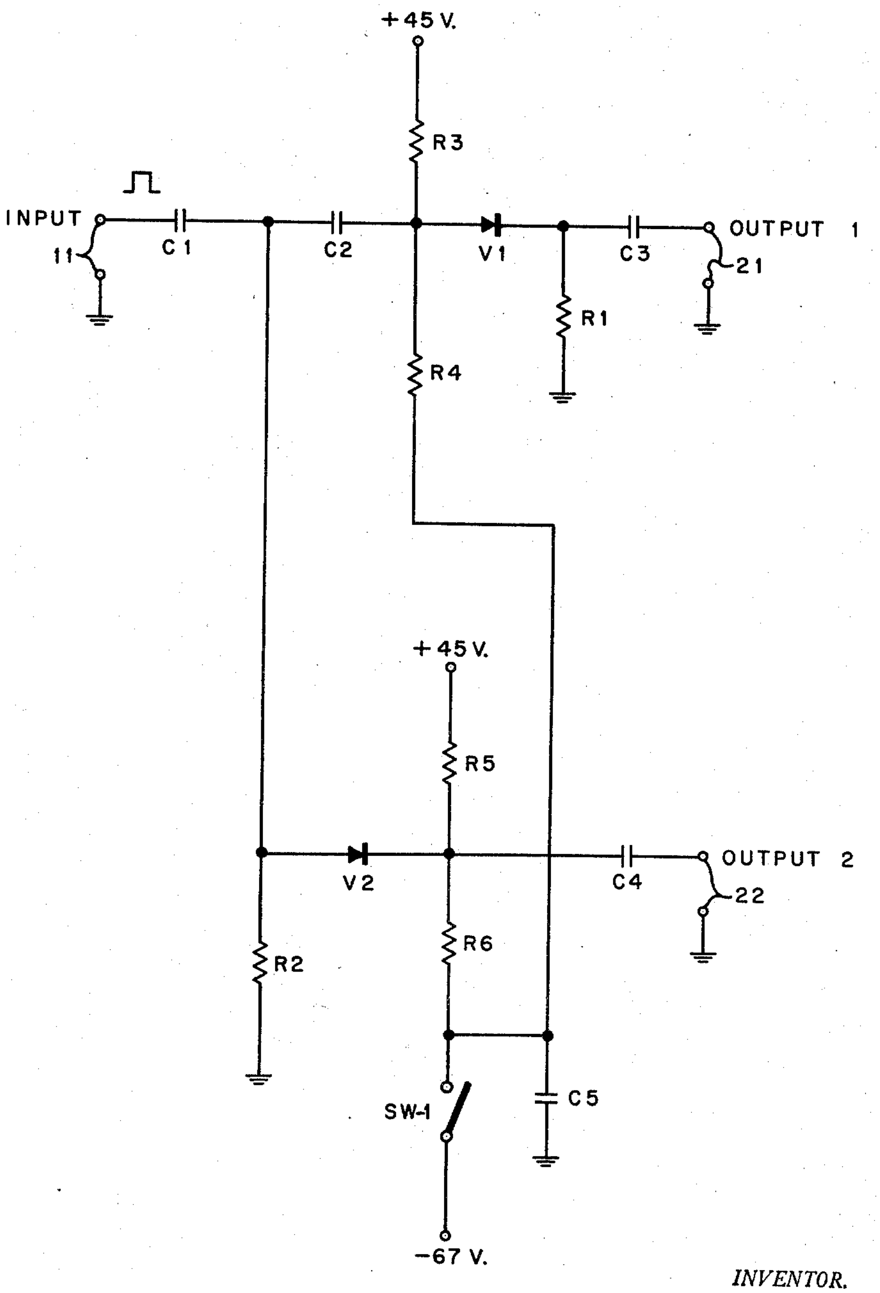
INVENTOR.
WILLIAM S. LEE
BY
ATTORNEYS 2,817,772
Patented Dec. 24, 1957

2,817,772

PULSE SWITCHING APPARATUS

William S. Lee, Ivyland, Pa., assignor to the United States of America as represented by the Secretary of the Navy Application September 29, 1955, Serial No. 537,604

2 Claims. (Cl. 307—88.5)

(Granted under Title 35, U. S. Code (1952), sec. 266)

The invention described herein may be manufactured and used by or for the Government of the United States of America for governmental purposes without the payment of any royalties thereon or therefor.

The present invention relates to a pulse switching apparatus and more particularly to a pulse switching apparatus which is fully electronic in nature.

Present devices for switching in electronic applications usually include mechanical relays or switches. The most common type of relay presently in use is an electromechanical device in which a current change in one circuit produces an armature movement that opens or closes contacts to produce a change in the electrical condition of another circuit. Such a device is affected by vibrations in the area and is thereby less reliable in operation. Moreover, because of the complex design of the armature and spring, this device is more costly. A switch, while being simple in construction, and less susceptible to adverse conditions, requires the actuator for the switch to be close at hand and is therefore not readily adaptable for remote operations. Also, the use of switches may sometimes be undesirable because of the introduction of unwanted capacitance to the circuit.

The present invention serves to overcome the defects and disadvantages of the prior switching apparatus mentioned above by providing for a wholly electronic design for a switch. The pulse switching apparatus of this invention utilizes a pair of crystal diodes operating in parallel and arranged with a plurality of capacitors and resistors so that a single input consisting of pulse waves may be selectively passed through either the first or the second crystal to a first or a second output, respectively. By the use of a remotely operated switch, the bias on the crystals may be selectively chosen as to bring about the aforementioned result. Except for the remotely operated switch, there are no moving parts in the switching apparatus of this invention nor are there any mechanical features which may be adversely affected by vibrations in the area.

A first object of the present invention is the provision of a pulse switching apparatus electronic in nature capable of selectively passing an input signal to one of a pair of outputs.

Another object is to provide a pair of crystals biased in a selective manner so as to permit one or the other to pass a pulsing signal applied to both of said crystals.

A further object of the invention is the provision of a remotely controlled electronic circuit capable of switching an input signal in accordance with a simple switch operated remotely of the apparatus.

Still another object is to provide electronic pulse switching apparatus having a single input and a plurality of outputs selectively controlled by a plurality of crystals of which one is permitted to pass the input signal to its respective output in accordance with a switch position selected by a remotely placed switch.

A final object of the present invention is the provision of apparatus for switching a signal into a remotely selected channel utilizing a plurality of crystals which are selectively biased by a controlling switch in order to accomplish the switching desired.

The exact nature of this invention as well as other objects and advantages thereof will be readily apparent from consideration of the following specification relating to the annexed drawing in which is shown diagrammatically the principles of this invention.

The drawing illustrates a pair of crystal diodes $V_1$ and $V_2$ connected in parallel. As is well understood in the art, the crystal diode presents a low impedance path when the current flows in the direction shown, that is, when the cathode is more negative than the plate. When current tends to flow in the opposite direction, against the arrow, the diode presents an extremely high impedance path. Therefore, the arrow in each of the diodes $V_1$ and $V_2$ indicates the plate portions of the diodes and the low resistance direction of current flow.

The input to the pulse switching apparatus illustrated in the form of electrical pulses is placed on leads 11 and is coupled into the switching system through capacitor $C_1$. A coupling capacitor $C_2$ serves to couple the input signal from capacitor $C_1$ to the plate of crystal diode $V_1$. The coupling capacitor $C_2$ also serves as a blocking capacitor to prevent the positive D. C. 45 volt supply shown connected to one end of resistor $R_3$ from being applied to the plate of $V_2$ which is connected at its plate to a point between capacitor $C_1$ and capacitor $C_2$.

The other side of $R_3$ is connected to a point which is common to the plate of diode $V_1$, one side of resistor $R_4$, and one side of capacitor $C_2$. The cathode of $V_1$ is coupled through capacitor $C_3$ across output leads 21 representing the first output of the switching apparatus. Resistor $R_1$ provides ground return from the cathode of crystal $V_1$. A second path from the input leads 11 includes a crystal diode $V_2$, the plate of which is directly tied to the junction between the capacitors $C_1$ and $C_2$. The cathode of $V_2$ is connected to the junction between a pair of voltage divider resistors $R_5$ and $R_6$. The other end of resistor $R_5$ is connected to a positive 45 volt D. C. source. The other end of resistor $R_6$ is connected to resistor $R_4$ and through a switch SW–1 to a negative 67 volt D. C. source. Of course, the power supply sources are by way of example only and others may be chosen to carry out the switching brought about by this invention. A capacitor $C_4$ couples the common point between resistors $R_5$, $R_6$ and the cathode of diode $V_2$ to the terminals 22 which comprise the second output for the switching system. A capacitor $C_5$ between $R_4$, $R_6$ and ground provides for RF by-pass. Resistors $R_3$, $R_4$, $R_5$ and $R_6$ may be of the same resistance value. A resistor $R_2$ is disposed between the plate of crystal $V_2$ and ground, providing for a current path return to ground when switch SW–1 is in closed position. It will be noted that the 45 volt positive D. C. source connected to $R_3$ has a continuous path through $R_3$, $R_4$, $R_6$, to the cathode of diode $V_2$.

The operation of the circuit is as follows: With switch SW–1 in open position, electron current flow takes the path from ground through resistor $R_1$, diode $V_1$ and flowing through two branches, one section flowing through resistor $R_3$ to the 45 volt power source, and the other section flowing through resistor $R_4$, resistor $R_6$, and resistor $R_5$ to the 45 volt D. C. supply source there. The plate of diode $V_1$, being exposed to the 45 volt positive D. C. sources is more positive than the cathode thereby permitting current flow through diode $V_1$. It will be noted that with switch SW–1 in an open position the —67 volt D. C. supply source is not open to the plate of $V_1$. However, since the cathode of $V_2$ is exposed also to the +45 volts, this makes diode $V_2$ a relatively high impedance path for current and this tube is thereby relatively non-conducting. In this position of switch SW–1, with diode $V_1$ conducting, the input pulses are switched to output 1 on leads 21.

When switch SW–1 is closed, the —67 volts are exposed through resistor $R_4$ to the plate of diode $V_1$ which is also exposed through resistor $R_3$ to the +45 volts connected thereto. Due to the fact that resistors $R_3$ and $R_4$ are of the same magnitude, the zero voltage point will be somewhere within resistor $R_3$ with the consequence that the plate of diode $V_1$ will be exposed to some voltage less than zero. Since the cathode of diode $V_1$ is connected through resistor $R_1$ to ground, the plate thereof will be more negative than the cathode, thereby presenting a high impedance path therethrough. In this position of switch SW–1, the —67 volt power supply is applied to the cathode of diode $V_2$ through resistor $R_6$ and also to both 45 volt positive D. C. sources through resistors $R_5$, $R_6$ and $R_3$, $R_4$ shown, respectively. By this arrangement, the cathode of $V_2$ will have some negative voltage applied and this will make diode $V_2$ conducting since the current tends to flow in the direction of the arrow shown. Therefore, with the switch SW–1 closed, the input pulsing signal supplied at leads 11 will pass through capacitor $C_1$, diode $V_2$, and capacitor $C_4$ to output leads 22 comprising the second output of the switching circuit. This path represents the low impedance path for the signal and the signal will thereby take this path.

The arrangement, as illustrated, provides resistors $R_3$, $R_4$, $R_5$ and $R_6$ all of the same value in order to obtain the proper bias on the diodes $V_1$ and $V_2$. However, as it is understood in the art, the relative values of these resistances do not have to be exactly alike as long as the proper relationships are maintained. Therefore, it is apparent that certain changes in the values of the circuit parameters may be varied within the limits of operability, substituting equivalent parts freely.

It is apparent from the foregoing that there has been provided a pulse switching apparatus which is relatively simple in construction, economical in use and reliable in operation. It is also subject to less vibration and chattering, and requires less maintenance than in the case of relays. It is also apparent that since switch SW–1 may be placed conveniently at any remote location, the circuit is highly adaptable for use where remote control is desirable. Also, the circuit does not add unwanted capacitance as is the case with switches.

Since certain changes in my invention may be made without departing from the spirit and scope thereof it is intended that all matters contained in the foregoing description and shown in the accompanying drawings shall be interpreted as illustrative and not in a limiting sense.

What I claim is:

1. Pulse switching apparatus comprising an input connection for electrical pulses and a pair of output connections for selectively passing said pulses, a separate path for each said output, diode means in each of said paths, each of said diode means comprising an anode and a cathode, the latter connected to its respective output connection, a source of positive voltage, means for connecting said positive voltage source through a first resistor to the anode of the first of said diodes, a source of negative voltage of higher magnitude than said positive voltage source, means connecting said negative voltage source to said anode of said first diode through an "on-off" switch and a second resistor in series, said switch when closed causing said first diode to be non-conducting and conducting when opened, means connecting said positive voltage source to the cathode of the second of said diodes through a third resistor, and means connecting said negative voltage source to said cathode of said second diode through a fourth resistor and said switch in series, said second diode being made conducting when said switch is closed and non-conducting when opened, whereby the position of said switch selects the output path for said input pulses.

2. Pulse switching apparatus comprising an input connection for electrical pulses and a pair of output connections for selectively passing said pulses substantially unaltered, a separate path for each said output, diode means in each of said paths, each of said diode means comprising an anode and cathode, the latter connected to its respective output connection, a source of positive voltage, means for connecting said positive voltage source through a first resistor to the anode of the first of said diodes, a source of negative voltage of higher magnitude than said positive voltage source, means connecting said negative voltage source to said anode of said diode through an "on-off" switch and a second resistor in series, said switch when closed causing said first diode to be non-conducting and conducting when opened, means connecting said positive voltage source to the cathode of the second of said diodes through a third resistor, and means connecting said negative voltage source to said cathode of said second diode through a fourth resistor and said switch in series, said first, second, third and fourth resistors being substantially of the same resistance values, said second diode being made conducting when said switch is closed and non-conducting when opened, whereby the position of said switch selects the output path for said input pulses.

References Cited in the file of this patent

UNITED STATES PATENTS

| | | |
|---|---|---|
| 2,466,959 | Moore | Apr. 12, 1949 |
| 2,541,399 | Blake | Feb. 13, 1951 |